United States Patent
Cox et al.

(10) Patent No.: US 10,762,328 B2
(45) Date of Patent: Sep. 1, 2020

(54) METHOD AND APPARATUS FOR IDENTIFYING A DEVICE WITHIN THE INTERNET OF THINGS USING INTERROGATION

(71) Applicant: Dell Products, LP, Round Rock, TX (US)

(72) Inventors: Tyler R. Cox, Austin, TX (US);
Spencer G. Bull, Austin, TX (US);
Ryan N. Comer, Austin, TX (US);
Shreya Gupta, Austin, TX (US);
Richard W. Schuckle, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 117 days.

(21) Appl. No.: 16/167,216

(22) Filed: Oct. 22, 2018

(65) Prior Publication Data

US 2020/0125829 A1     Apr. 23, 2020

(51) Int. Cl.
| | |
|---|---|
| *G06K 9/00* | (2006.01) |
| *H04W 8/00* | (2009.01) |
| *H04W 4/80* | (2018.01) |
| *H04L 29/12* | (2006.01) |

(52) U.S. Cl.
CPC ..... *G06K 9/00201* (2013.01); *G06K 9/00013* (2013.01); *H04W 4/80* (2018.02);
(Continued)

(58) Field of Classification Search
CPC ........... H04W 4/02; H04W 4/14; H04W 4/22; H04W 4/029; H04W 4/90; H04W 4/80;
(Continued)

(56) References Cited

U.S. PATENT DOCUMENTS 6,690,488 B1 * 2/2004 Reuman .............. H04N 17/002
348/E17.001
8,315,620 B1 * 11/2012 Williamson .......... H04L 67/306
455/418

(Continued)

FOREIGN PATENT DOCUMENTS

| GB | 2406473 A * | 3/2005 | ............. H04W 16/18 |
| WO | WO-0123860 A1 * | 4/2001 | ............. H04N 17/002 |
| WO | WO-2013140646 A1 * | 9/2013 | ............. G06Q 50/01 |

*Primary Examiner* — Mahendra R Patel
(74) *Attorney, Agent, or Firm* — Prol Intellectual Property Law, PLLC; H. Kenneth Prol

(57) ABSTRACT

A method of identifying an unknown device via interrogation may comprise determining a communication address of an unknown device in communication with an information handling system, capturing a digital image of the unknown device, determining the unknown device belongs to a known class of devices via an object recognition algorithm to analyze the digital image, accessing a device class registry listing a plurality of candidate object identifications associated with the known class of devices, identifying a stimulus action or actuation associated with a first of the plurality of candidate device identifications. The method may also comprise performing the stimulus action, receiving an indication via the communication address indicating the unknown device detected the stimulus action, and associating the communication address of the unknown device with the first of the plurality of candidate device identifications.

20 Claims, 5 Drawing Sheets

(52) U.S. Cl.
CPC ......... *H04W 8/005* (2013.01); *H04L 61/6022* (2013.01); *H04L 61/6059* (2013.01)

(58) Field of Classification Search
CPC ...... H04W 12/02; H04W 4/023; H04L 29/06; H04L 63/168; H04L 67/1004; H04L 63/20; H04M 1/72572; G06Q 50/01; G06F 17/30; G06K 9/00; G06K 9/46; G06K 9/66; G06K 9/00771; G06K 9/32; G06K 9/00362; G06K 9/00624; G06K 9/4604
USPC ........ 382/154, 100, 103, 224; 348/156, 143, 348/82
See application file for complete search history.

(56) References Cited

U.S. PATENT DOCUMENTS

| | | | | |
|---|---|---|---|---|
| 8,531,523 B2* | 9/2013 | Anderson | .......... | G06K 9/00771 348/143 |
| 9,043,238 B2* | 5/2015 | Holten | .................. | G06T 11/206 705/3 |
| 9,900,119 B2* | 2/2018 | Daoura | .................... | H04W 4/90 |
| 2005/0254712 A1* | 11/2005 | Lindeman | ................ | G06K 9/00 382/224 |
| 2008/0025561 A1* | 1/2008 | Rhoads | .................. | G01C 11/00 382/100 |
| 2008/0293430 A1* | 11/2008 | Blom | ................ | G01C 21/3484 455/456.1 |
| 2012/0327410 A1* | 12/2012 | Maston | ................ | G01J 3/0264 356/307 |
| 2014/0192197 A1* | 7/2014 | Hanko | ................ | H04L 12/2829 348/156 |
| 2016/0092736 A1* | 3/2016 | Mai | .................. | G06K 9/00624 |
| 2016/0225203 A1* | 8/2016 | Asmar | ............... | G07C 9/00309 |
| 2017/0238129 A1* | 8/2017 | Maier | ............... | H04M 1/72538 455/404.2 |
| 2018/0005190 A1* | 1/2018 | Innes | ................ | G06Q 10/1053 |
| 2018/0114595 A1* | 4/2018 | Stern | ...................... | G16H 15/00 |
| 2018/0186626 A1* | 7/2018 | Staton | ...................... | B81B 7/04 |
| 2018/0206100 A1* | 7/2018 | Eisner | .................. | H04W 64/00 |
| 2018/0211380 A1* | 7/2018 | Tandon | .................. | G06T 7/0012 |
| 2018/0235828 A1* | 8/2018 | MacMahon | .......... | A61H 1/0222 |

* cited by examiner

US 10,762,328 B2

METHOD AND APPARATUS FOR IDENTIFYING A DEVICE WITHIN THE INTERNET OF THINGS USING INTERROGATION

FIELD OF THE DISCLOSURE

The present disclosure generally relates to devices within the Internet of Things (IoT). The present disclosure more specifically relates to identifying a device within the IoT using an interrogation method to actuate or stimulate the device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a network adapter capable of communicating wirelessly with devices within the Internet of Things.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
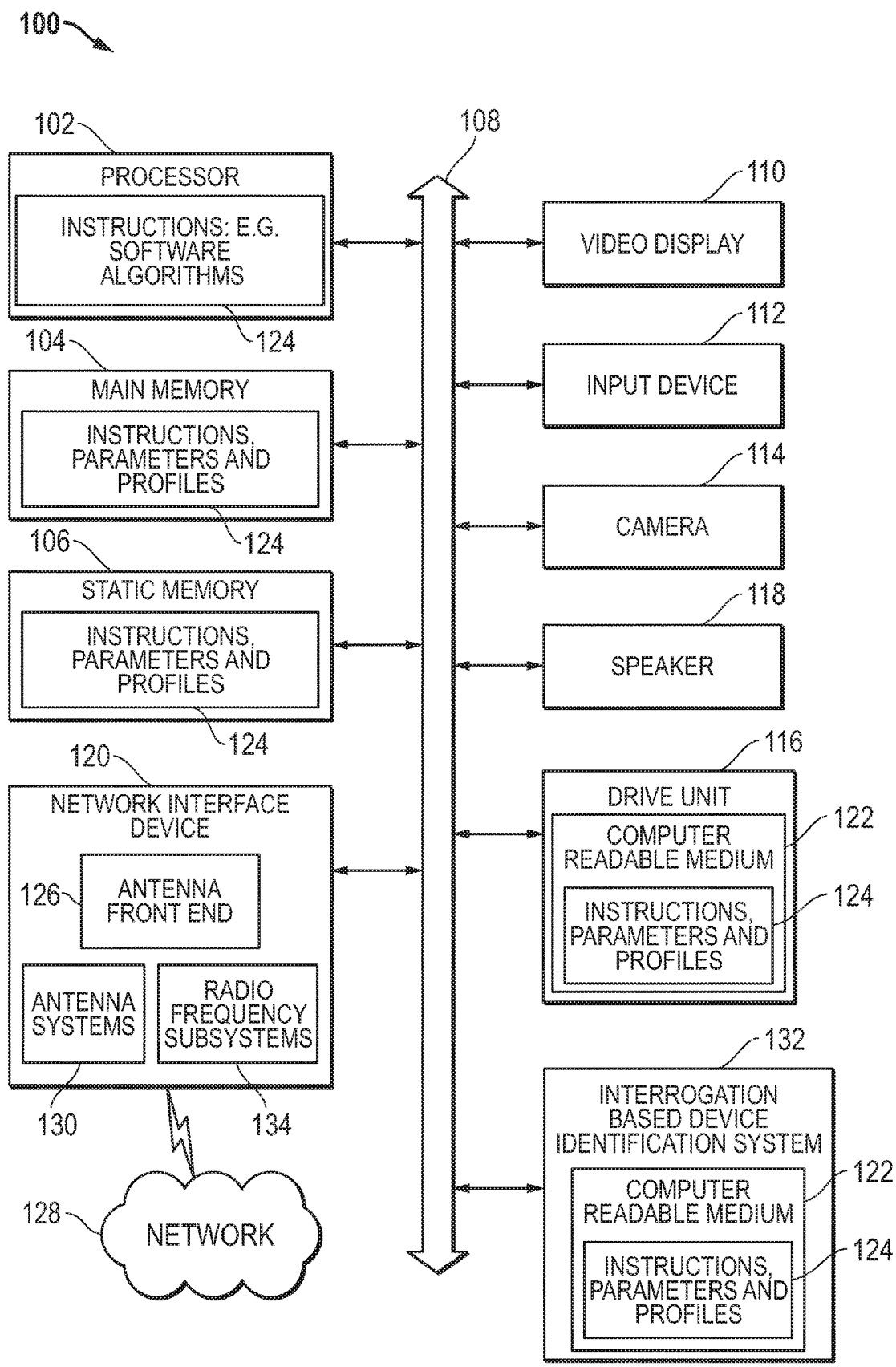
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

New devices and sensors capable of wired and wireless communication are introduced daily as the popularity of the Internet of Things (IoT) grows. As a consequence of the addition of so many new devices, several different devices of the same type may operate within the same local area, such that a potential user may not be capable of identifying a specific device within a list of detected devices. For example, an information handling system in embodiments of the present disclosure may establish communications with a plurality of IoT motors in a local environment, but may only be capable of identifying each motor by its name, media access control (MAC), or internet protocol (IP) address. Such MAC or IP address may fail to specify which motor it belongs to, or whether such an address even applies to an IoT motor. Similarly, a name of a device may simply indicate "motor" without specifying which of several available motors it is. A method is needed to associate a device identity with a known name identification, or MAC or IP address.

An interrogation based device identification system addresses such an issue in embodiments of the present disclosure by associating a device name or a MAC or IP address with a device identification when the device having the name, or MAC or IP address positively responds to a stimulus known to prompt a response from similar devices, or performs an action in response to an actuation instruction to which similar devices are known to respond. An information handling system in embodiments of the present disclosure may include a camera for capturing an image of the initially unknown device having the identified name, or MAC or IP address. For example, a three-dimensional image or RGBD depth image may be captured by a camera mounted on or within the information handling system executing code instructions of the interrogation based device identification system. Such an information handling system may be, for example, a laptop or tablet computing device. In some embodiments, an augmented reality or virtual reality head mounted display device may be operably attached to the information handling system and may include the three-dimensional camera capturing the image of the initially unknown device.

An object recognition module in such an information handling system in embodiments may perform an object recognition algorithm on the captured image and identify the class of device in the image. For example, the object recognition module may identify the unknown device as falling within one of the following classes: a wireless communication tower, a motor, camera, an IoT locking mechanism (e.g. door lock, car lock), or another information handling system. In other embodiments, the object recognition module may identify the unknown device as falling within a class of smart home appliances, or a class of IoT sensors.

The interrogation based device identification system in embodiments of the present disclosure may access a stored registry that lists all known devices within the identified class of the unknown device. For example, a registry associated with a class of smart home appliances may list one or more examples of thermostats, light bulbs, electrical outlets, dishwashers, clothes washers/dryers, or coffee makers. As yet another example, a registry associated with a class of IoT sensors may list one or more examples of thermometers, light detectors, barometers, microphones, motion detectors, HEPA filters, timers, electromagnets, fingerprint scanners, retinal scanners, or iris scanners. Each registry may further associate each of the listed devices with an actuation such a device is known to take in response to an actuation instruction, or a stimulus such a device is known to respond to in a particular manner. For example, a DC motor registry may associate a specific type of motor with the actuation of turning on when an instruction is received by that motor. As another example, an IoT sensor registry may associate an IoT camera with the action of capturing an image when it detects a thermal signature indicating human body heat or detects motion within its range.

In embodiments of the present disclosure, the interrogation based device identification system may determine which of the devices listed within the registry the unknown device is by determining how the unknown device responds to the actuations or stimulations within the registry. For example, in an embodiment, the interrogation based device identification system may transmit an instruction to activate a specific type of motor to the MAC or IP address of an unknown device, or to a device having a given name in a list of detected devices determined to fall within the class of DC-motors. If the unknown device turns on, the interrogation based device identification system may then associate the name, or MAC or IP address of the unknown device with the specific type of DC motor identified in the registry. As another example embodiment, the interrogation based device identification system may display an instruction to a user to perform a physical movement (e.g. waving a hand) nearby an unknown device determined to fall within the class of motion sensing IoT sensors. If the unknown device responds to the physical movement by transmitting an indication to the interrogation based device identification system that it sensed the movement, the interrogation based device identification system may associate the device name, or MAC or IP address of the unknown device with the specific type of motion sensing IoT sensor identified in the registry. In such a way, the interrogation based device identification system may identify unknown IoT devices using simple interrogation methodology.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, augmented reality or virtual reality device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. In some embodiments, the processor 102 may be a graphics processing unit (GPU). Any of the processing resources may operate to execute code that is either firmware or software code. Moreover, the information handling system 100 can include memory such as main memory 104, static memory 106, computer readable medium 122 storing instructions 124 of the interrogation based device identification system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a host video display 110. The host video display 110 in an embodiment may function as a liquid crystal display (LCD), an organic light emitting diode (OLED), a flat panel display, a solid state display, or a cathode ray tube (CRT). In some embodiments, the video display 110 may be housed within a head mounted display, and may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display may use any method that reflects projected images in order to create an augmented reality.

Additionally, the information handling system 100 may include an input device 112, such as a keyboard, and/or a cursor control device, such as a mouse, touchpad, or gesture or touch screen input. The information handling system 100 may also include a camera 114, which may be an RGB camera, an infrared digital camera, a telephoto lens digital camera, a fish-eye digital camera, a wide-angle digital camera, a close-focus digital camera, an array camera such as a CMOS array camera or an array camera composed of other light sensors, or any other type of two-dimensional digital camera. The camera 114 may also be a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art. The camera 114 may also be mounted on or within a head mounted display device for augmented reality or virtual reality. The information handling system 100 can also include a speaker 118 and a disk drive unit 116.

The information handling system 100 may also include an interrogation based device identification system 132 that may be operably connected to the bus 108. The interrogation based device identification system 132 computer readable medium 122 may also contain space for data storage. The interrogation based device identification system 132 may perform tasks related to identifying sensors or actuators by a network layer or data link layer address using an interrogation method.

In an embodiment, the interrogation based device identification system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. It is understood that other devices such as peripheral devices may be connected via wireless or wired connectivity as well according to various protocols described herein.

The information handling system 100 can include a set of instructions 124 that can be executed to cause the computer system to perform any one or more of the methods or computer based functions disclosed herein. For example, instructions 124 may execute an interrogation based device identification system 132, software agents, or other aspects or components. Instructions 124 may also execute instructions of an object recognition module and/or code instructions for augmented reality or virtual reality display systems. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116 and the interrogation based device identification system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. Instructions relating to the interrogation based device identification system 132 software algorithms may be stored here. For example, tables used in identifying objects by associating device classes with possible actuations and/or possible stimuli to which such a device class may react may be stored in a device registry in the drive unit 116, static memory 106, or main memory 104. In a particular embodiment, the instructions, parameters, and profiles 124 may reside completely, or at least partially, within the main memory 104, the static memory 106, and/or within the disk drive 116 during execution by the processor 102 of information handling system 100. As explained, some, or all of the interrogation based device identification system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The interrogation based device identification system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
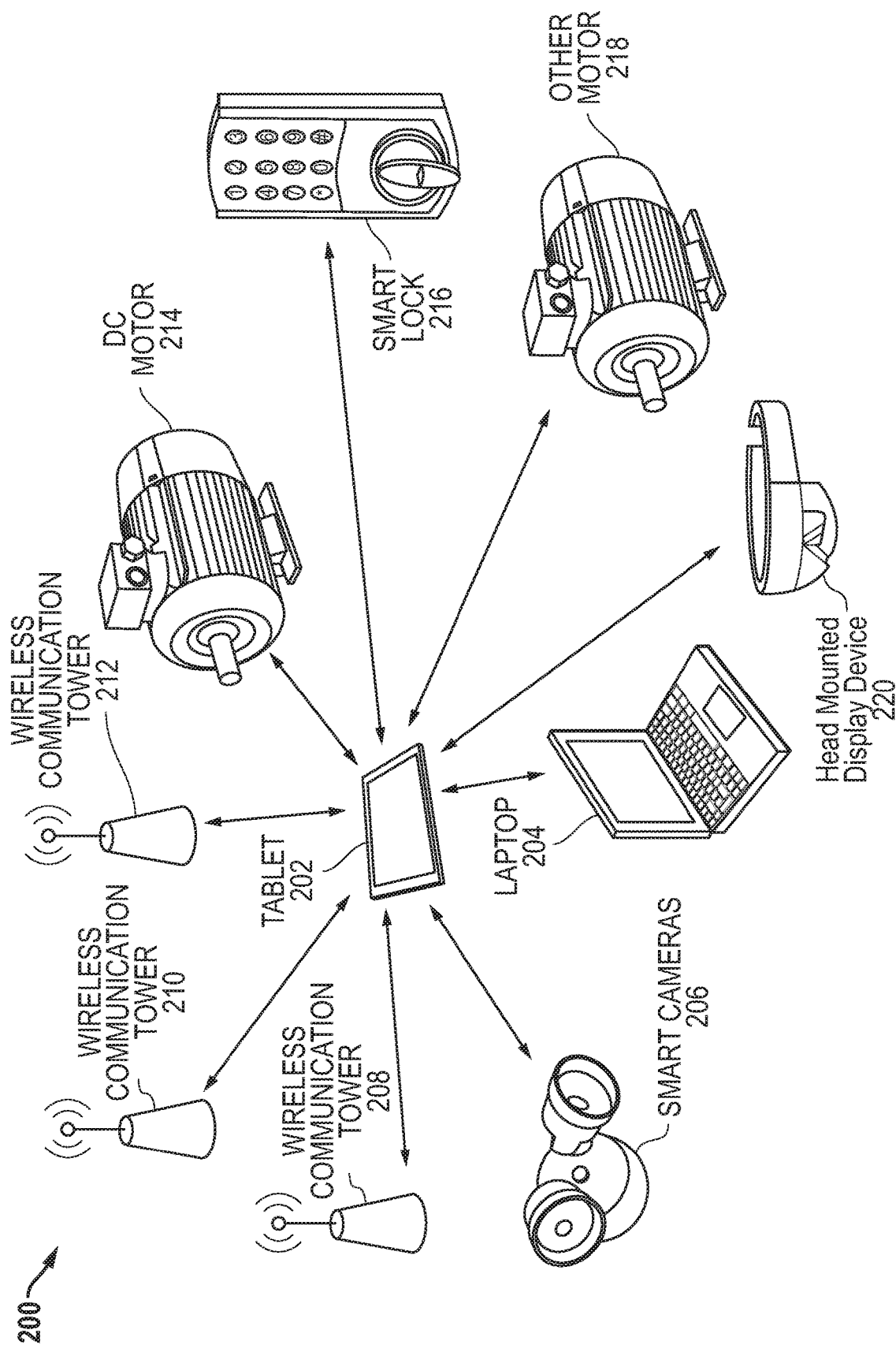
FIG. 2 is a graphical diagram of a plurality of IoT devices according to an embodiment of the present disclosure.

FIG. 2 is a graphical diagram of a plurality of IoT devices within a communication network according to an embodiment of the present disclosure. In an embodiment, an interrogation based device identification system may operate onboard an information handling system such as, for example, the tablet computer 202. In other embodiments, the interrogation based device identification system may operate on another type of information handling system, such as a laptop computer, a desktop computer, a smart phone, another type of mobile information handling system, or a server. The tablet 202 in an embodiment may be capable of communication with a plurality of IoT devices or other information handling systems via a wireless communication system 200. The wireless communication system 200 may be a LAN, WLAN, WWAN, WPAN, or another type or mix of types of network connections in an embodiment.

The tablet 202 in an embodiment may be in communication with one or more of a laptop 204, a smart camera 206, wireless communication tower 208, wireless communication tower 210, wireless communication tower 212, DC motor 214, smart lock 216, and/or DC motor 218. For example, the tablet 202 may be capable of communicating with one or more devices 204-218 via network 200 according to the Bluetooth standard, the Simple Network Management Protocol (SNMP) defined by the Internet Engineering Task Force (IETF), and/or the Building Automation and Control Network (BACnet) standard defined by the International Standards Organization (ISO) standard 1648.54. As another example, network 200 may be a WLAN, or a WPAN network operating according to a the IPv6 over Low Power Wireless Personal Area Networks (6LoWPAN) protocol developed by the Internet Engineering Task Force (IETF), the LoRa physical layer protocol, the ZigBee network layer protocol, or the Thread network layer protocol. Further, the tablet 202 may be capable of communicating with each of these devices 204-218 via different types of network connections. For example, the tablet 202 may communicate with the camera 206 via the Zigbee network layer protocol, with the smart lock 216 via the 6LoWPAN standard, and via the motor 218 via the BACnet standard. The wireless communication towers 208-212 in one embodiment may be access points. In other embodiments, the communication towers 208-212 may be base stations and may include macrocellular subsystems. Further, the tablet 202 may instruct operation of an operably connected to a peripheral head mounted display device 220 capable of augmented reality or virtual reality display and interaction.

Each of the devices 204-218 may perform an actuation in response to an instruction and/or perform a preset action upon detection of a given stimulus. An actuation in an embodiment may include any physical or visible action performed by a device in response to an electrical code instruction. In contrast, a device may detect a stimulus caused by an observed physical phenomenon and consequently generate a preset electrical signal in response. A controller operably connected to such a device may then respond to the received electrical signal by transmitting a message indicating such a phenomenon has been detected, or may initiate a code instruction to that device or another device to perform some action based upon the detection of the phenomenon.

For example, the laptop 204 may include a microphone that is capable of detecting an acoustic stimulus, such as a particular sound. More specifically, a microphone, in combination with voice recognition software operating onboard the laptop 204 may detect a human voice within range of the microphone, identify the human voice as an authorized user, and respond to such a stimulus by granting the user access to the information handling system of the laptop 204. As another example, the laptop 204 may include a fingerprint scanner that is capable of detecting a biological stimulus, such as a distinct fingerprint of an authorized user, and consequently granting access to the information handling system of the laptop 204. As yet another example, the laptop 204 may include a retinal scanner that is capable of capturing an image of a nearby human's eye, identifying the retina within the image belongs to that of an authorized user, and responding to that stimulus by granting access to the information handling system of the laptop 204. As a further example, the laptop 204 may include a camera and face recognition software that may operate in tandem to capture an image of a nearby human's face, determine that face belongs to an authorized user, and consequently grant access to the information handling system of the laptop 204. By prompting the laptop 204 with any of these known stimuli and observing an expected response from the laptop 204, the interrogation based device identification system may confirm that the IP or MAC address to which the instruction for such a known stimuli was sent belongs to the laptop 204. In another embodiment, the interrogation based device identification system may prompt a named device within a list of detected devices with the known stimuli. Upon observing the expected response from the named device in such an embodiment, the interrogation based device identification system may confirm that the device which was prompted with the stimuli is the laptop 204.

The camera 206 in another embodiment may be capable of responding to a plurality of optical stimuli. For example, the camera 206 may be capable of capturing an infrared image of an area immediately surrounding it, and detecting a human presence by its heat signature/shape. As another example, the camera 206 in an embodiment may also be capable of detecting motion of an object nearby the camera 206. As yet another example, the camera 206 may be capable of face recognition, iris recognition, or retinal recognition for an image captured of a human nearby the camera 206. The camera 206 in an embodiment may respond to any of these stimuli by generating an electrical signal to an operably connected controller, indicating such stimuli have been detected. In an example embodiment in which motion or a human body have been detected nearby (e.g. in a home security system), such a controller may respond to such an electrical signal by transmitting a message to a user interface of the tablet 202 indicating people are approaching the home. In another example embodiment of a home or vehicle security system in which an authorized user's face, retina, or iris has been recognized, such a controller may respond to such an electrical signal by granting that person access to the home or vehicle. By prompting the camera 206 with any of these known stimuli and observing an expected response from the camera 206, the interrogation based device identification system may confirm that the IP or MAC address to which the instruction for such a known stimuli was sent belongs to the camera 206. In another embodiment, the interrogation based device identification system may prompt a named device within a list of detected devices with the known stimuli. Upon observing the expected response from the named device in such an embodiment, the interrogation based device identification system may confirm that the device that was prompted with the stimuli is the camera 206.

The camera 206 in another embodiment may be capable of performing an actuation of some kind. For example, the camera 206 in an embodiment may perform the electronic actuation of capturing an image pursuant to a code instruction to do so received from the tablet 202 in an embodiment. The camera 206 in an embodiment may be a RGB camera, an infrared digital camera, a telephoto lens digital camera, a fish-eye digital camera, a wide-angle digital camera, a close-focus digital camera, an array camera such as a CMOS array camera or an array camera composed of other light sensors, or any other type of two-dimensional digital camera. The camera 206 may also be a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art. By transmitting an instruction to the camera 206 to perform one of these known actuations and observing an expected response from the camera 206, the interrogation based device identification system may confirm that the IP or MAC address to which such an instruction was sent belongs to the camera 206. In another embodiment, the interrogation based device identification system may transmit an instruction to a named device within a list of detected devices to perform one of the known actuations. Upon observing the expected response from that named device in such an embodiment, the interrogation based device identification system may confirm that the device to which the instruction was transmitted is the camera 206. The camera 206 may also be used to capture images of other objects for recognition by the interrogation based object identification system.

In another embodiment, any of the wireless communication tower 208, wireless communication tower 210, and wireless communication tower 212 may be capable of performing an actuation in response to a received code instruction. For example, towers 208-212 may receive a code instruction from the tablet 202 to cause one or more light emitting diodes (LEDs) to blink in a given pattern or with a given color to indicate the towers 208-212 have received the instruction. The wireless communication towers 208-212 in an embodiment may be a WWAN base station, a WLAN access point, or a node within a wireless network. By transmitting an instruction to one or more of the wireless communication towers 208-212 to perform one of these known actuations and observing an expected response from one or more of the towers 208-212, the interrogation based device identification system may confirm that the IP or MAC addresses to which such an instruction was sent belong to the one or more wireless communication towers 208-212 that performed the actuation. In another embodiment, the interrogation based device identification system may transmit an instruction to a named device within a list of detected devices to perform one of the known actuations. Upon observing the expected response from that named device in such an embodiment, the interrogation based device identification system may confirm that the device to which the instruction was transmitted was one of the communication towers 208-212.

The DC motor 214 and other motor 218 in another embodiment may be capable of performing an actuation in response to a received code instruction from the tablet 202. For example, motors 214 and 218 may receive a code instruction from the tablet 202 and may respond by switching from an OFF state to an ON state to indicate receipt of such an instruction. In an embodiment, the AC or DC motor 214 may be incorporated within another device in an embodiment, such as a drone (e.g. flying, driving, aquatic), robotic cleaning system (e.g. electronic floor sweeper), a fan, a printer, electrical vehicle, or other AC-power or DC-power based appliance. The other motor 218 in an embodiment may be any AC, DC, or non-electrical motor, such as in a factory environment. In other embodiments, devices within which the other motor 218 may be incorporated may include an A/C appliance (e.g. washer/dryer, dishwasher, HVAC unit, freezer or refrigeration unit, ventilation unit, fire detection system), or a non-electrical vehicle (e.g. gasoline powered, non-hybrid automobile or other vehicle). In some embodiments, such motors 214 or 218 may include a series of light emitting diodes (LEDs) of one or more colors that may be actuated to blink or emit certain patterns. By transmitting an instruction to one or both of the DC motor 214 and/or the other motor 218 to perform one of these known actuations and observing an expected response from either or both of the DC motor 214 and the other motor 218, the interrogation based device identification system may confirm that the IP or MAC address to which such an instruction was sent belongs to the motor 214 or 218 that responded by performing the actuation. In another embodiment, the interrogation based device identification system may transmit an instruction to a named device within a list of detected devices to perform one of the known actuations. Upon observing the expected response from that named device in such an embodiment, the interrogation based device identification system may confirm that the device to which the instruction was transmitted is the motor 214 or 218.

In another embodiment, the smart lock 216 may be capable performing an actuation in response to a received code instruction from the tablet 202. For example, the smart lock 216 may include an LED located on its front panel (e.g. directly above the deadbolt lock), and may respond to an instruction from the tablet 202 by causing the LED to light up, light up in a particular color, or in a particular pattern. In another example, the smart lock 216 may respond to an instruction received from the tablet 202 by unlocking or locking the deadbolt mechanism. In another example, if a user were to enter an incorrect passcode multiple times, the smart lock 216 in an embodiment may perform the electronic actuation of transmitting a message to a user interface of the tablet 202 indicating someone has repeatedly failed to access the house. By transmitting an instruction to the smart lock 216 to perform one of these known actuations and observing an expected response from the smart lock 216, the interrogation based device identification system may confirm that the IP or MAC address to which such an instruction was sent belongs to the smart lock 216. In another embodiment, the interrogation based device identification system may transmit an instruction to a named device within a list of detected devices to perform one of the known actuations. Upon observing the expected response from that named device in such an embodiment, the interrogation based device identification system may confirm that the device to which the instruction was transmitted is the smart lock 216.

Other devices in communication with tablet 202, but not shown in FIG. 2 may include a smart outlet or power strip, and/or smart lighting solutions (e.g. LED or incandescent light bulbs). Further, such devices, and one or more of the devices 204-218 may communicate directly with one another, and may cause other devices to perform specific actuations in some embodiments. For example, in an embodiment, upon unlocking the deadbolt, the smart lock 216 may perform the electronic actuation of transmitting an instruction to the motor 218 to turn a specific heating or cooling unit on. As another example, in an embodiment in which the smart camera 206 positively identifies an authorized person by facial recognition, it may transmit a message to the smart lock 216 to unlock the deadbolt. As yet another example, in an embodiment in which the smart camera 206 determines sunset has occurred and the smart lock 216 indicates a home owner has just been granted access to the home, one or more smart lighting solutions may turn on to better illuminate the home.

Each device within the network 200 may have a unique and static media access control (MAC) address, and a unique IP address that may be assigned statically or dynamically depending upon the network configuration. The network may have a tree-hierarchy, or a mesh architecture, and may be fixed or ad-hoc. It may also include one or more base stations, access points, or nodes not pictured in FIG. 2.

Tablet 202 may be capable of polling all nearby devices, or performing a similar inquiry, including devices 202-218 in order to identify them by name, MAC address, or IP address. In some cases, polling devices may result in identification of the device by its type or function, if the device has been preset to provide such information in response to a polling request. For example, in an embodiment in which the wireless communication tower 208 is a WLAN access point or internet router, the tablet 202 may receive the MAC or IP address of the wireless communication tower 208 in response to a polling request, and may also receive a name of the router. In other cases, devices may provide a MAC or IP address in response to a polling request, but may provide no further identifying information. In such cases, the tablet 202 may identify multiple MAC or IP addresses for nearby devices, but may not be capable of determining the type of devices to which those MAC or IP addresses belong. For example, if the tablet 202 received the MAC or IP address of the smart camera 206, and the DC motor 214 in such a scenario, it may have no way of determining which address belongs to which device. In another example embodiment involving maintenance of a plurality of HVAC units situated nearby one another, such as in an office building, the tablet 202 may receive MAC or IP addresses for each of the units, but may not be capable of distinguishing which HVAC unit is associated with which address.

Figure 3:
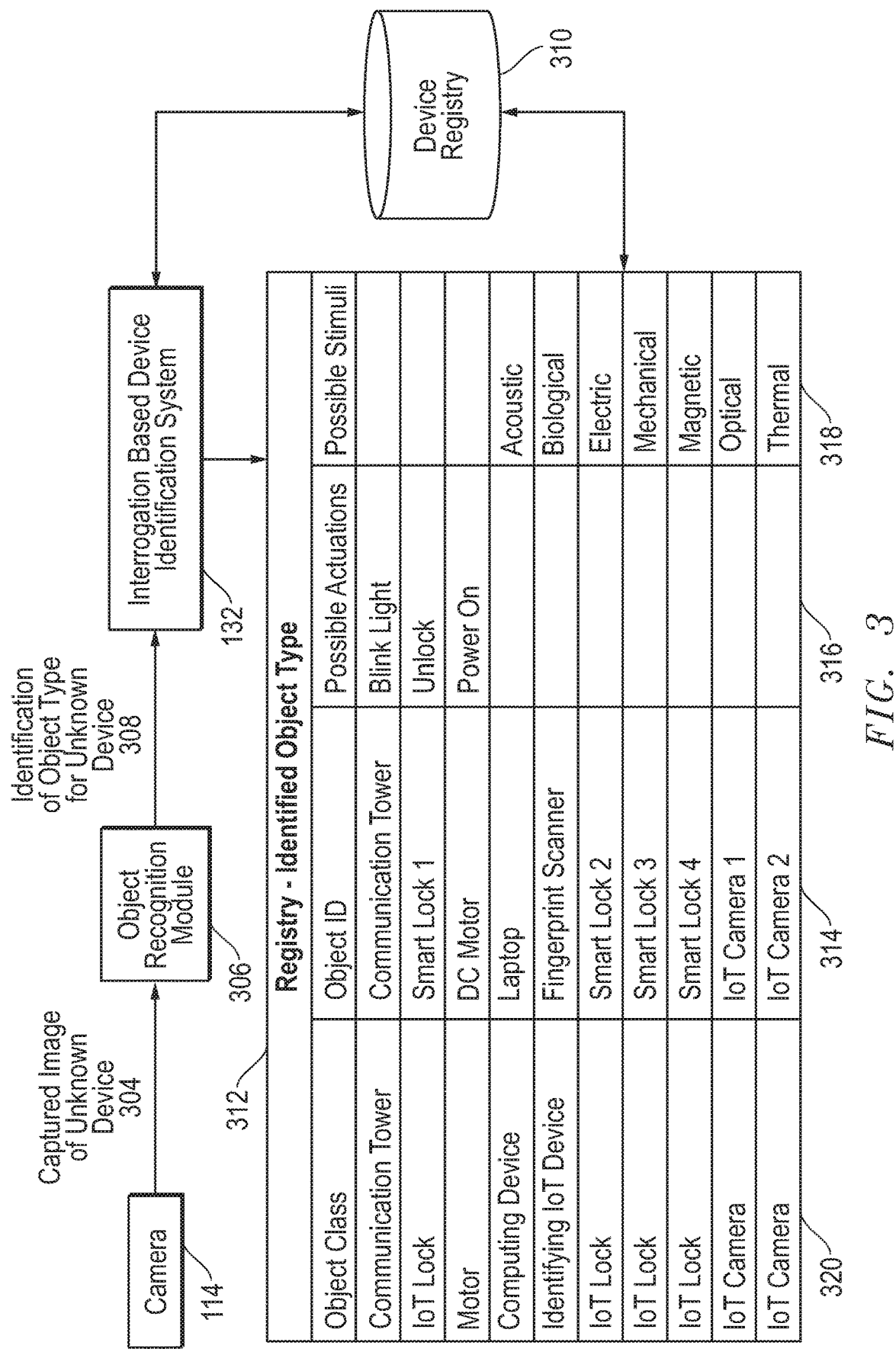
FIG. 3 is a block diagram illustrating an interrogation based device identification system according to an embodiment of the present disclosure.

FIG. 3 is a block diagram illustrating an interrogation based device identification system and an object recognition module of an information handling system according to an embodiment of the present disclosure. The interrogation based device identification system operating onboard the tablet in an embodiment may positively identify nearby devices based on object recognition and interrogation of the device. The tablet 202 described with reference to FIG. 2 may include one or more subcomponents and/or systems described with reference to FIG. 3. For example, the tablet may include a camera 114, which may be capable of capturing an image of an unknown device such as any of the devices surrounding the tablet as described with reference to FIG. 2. More specifically, the tablet camera 114 may capture an image of one of the wireless communication towers and transmit that captured image at arrow 304 to the object recognition module 306. In some embodiments, the tablet 202 may be operably connected to a peripheral head mounted display device 220 for display of an augmented reality or virtual reality. In such an embodiment, the camera 114 may be mounted within or on the head mounted display 220. In still other embodiments, the interrogation based device identification system may operate onboard a laptop computer, which may also optionally be operably connected to the peripheral head mounted display device 220. In any of these embodiment, the device whose image is being captured at arrow 304 is "unknown" in that the device is generically identified (e.g. identification not sufficient to differentiate it from other detected devices), or the MAC or IP address of that device has been identified, but that MAC or IP address did not specifically identify the type of device to which it belongs.

The object recognition module 306 in an embodiment may also operate onboard the tablet, and may perform an object recognition algorithm on the received captured image of the unknown device. For example, the object recognition module 306 may perform the object recognition algorithm on the received image of the wireless communication tower (whose name is generic, or whose IP or MAC address does not identify the device as a wireless communication tower, hence making it "unknown") in order to positively identify the device in the captured image as wireless communication tower. In an embodiment, several different types of wireless communications towers may be known to exist, and each may have a different functionality. For example, some wireless communications towers may be capable of communication via only WWAN, only WLAN, only WPAN, or at some specific subset of frequencies. More specifically, some wireless communication towers may transmit and receive data only within the 2.4 GHz band, and the 5 GHz band according to IEEE standard 802.11ad, while others may additionally transmit and receive in the 60 GHz band, the 80 GHz band, and/or unlicensed WWAN frequencies according to the IEEE standard 802.11ax. The object recognition module 306 may positively identify the "unknown" device as a wireless communication tower, but may not be capable of further identifying which kind of wireless communication tower it is.

Further, the tablet operating the interrogation based device identification system 132 may be in communication with a plurality of wireless communication towers (e.g. towers 208-212 in FIG. 2). In such an embodiment, the identification transmitted at arrow 308 may indicate that the object in the captured image is a wireless communication tower, but it may not identify which of the several detected communication towers is pictured in the captured image. As such, the identifying information transmitted to the interrogation based device identification system 132 in an embodiment at arrow 308 may identify the "type" or "class" of object identified in the captured image.

Upon receipt of an identification of the object type or class for the unknown object, the interrogation based device identification system 132 in an embodiment may access a table for identification of a specific object 312 within a device registry 310 stored in memory and associated with the identified object type or class. The device registry 310 may be an accessible database located locally or remotely from the processor operating the interrogation based device identification system in various embodiments. A registry table 312 may be stored within the device registry 310, and may list all devices that have been detected, or for which a MAC or IP address has been identified.

In an embodiment, the table 312 may include multiple devices having different object types or classes within the same table 312. Each row of the registry 312 may include information pertaining to a single device, and the first column 320 of the registry 312 may indicate the object class to which each of device belongs. For example, the communication tower device identified in the third row of the registry 312 may belong to the communication tower object class, the DC motor identified in the fifth row of the registry 312 may belong to the motor object class, the laptop identified in the sixth row may belong to the computing device object class, and the fingerprint scanner identified in the seventh row may belong to the identifying IoT device object class. As a further example, the four smart locks identified in the fourth, and eighth through tenth rows of the registry 312 may belong to the IoT lock object class. As yet a further example, the two IoT cameras identified in the eleventh and twelfth rows of the registry 312 may belong to the IoT camera object class. In some embodiments, each of these object classes may be associated with separate table 312. For example, a separate table 312 for each of the object classes (e.g. communication tower, IoT lock, motor, computing device, identifying IoT device, and IoT camera) may be stored in the registry 310.

Table 312 in an embodiment may associate an object identification listed in column 314 with a possible actuation that device may be capable of affecting, as listed in column 316, and/or with a possible stimulus that device may be capable of detecting, as listed in column 318. Some devices may be associated with only possible stimuli or only possible actuations in an embodiment. In other embodiments, some devices may be associated with both a possible stimulus and a possible actuation. For example, in an embodiment in which a motor is equipped with an infrared (IR) sensor, the motor may be associated with both the actuation of engaging the motor, and with a stimulation of the IR sensor.

The interrogation based device identification system 132 in an embodiment may access the registry 312 in order to determine what type of action it can elicit from the unknown device in order to positively distinguish the unknown device from other detected devices, or to positively associate the unknown device with one of the MAC or IP addresses identified. For example, in an embodiment in which the object recognition module 306 has identified the device in the captured image as a wireless communication tower, the interrogation based device identification system 132 may use the registry 312 to determine a wireless communication tower may be capable of blinking a light in response to a transmitted instruction to do so, as shown in the third row of the registry 312. In such an embodiment, the interrogation based device identification system may transmit such an instruction to turn the light on to one of several detected devices. If the device captured in the image responds to the transmitted instruction by causing the light to blink, the interrogation based device identification system 132 may associate that one of several detected devices with the wireless communication tower. In another embodiment, the interrogation based device identification system may transmit such an instruction to turn the light on to a MAC or IP address not associated with a device name. If the device captured in the image responds to the transmitted instruction by causing the light to blink, the interrogation based device identification system 132 may associate that MAC or IP address with the wireless communication tower.

As another example, in an embodiment in which the object recognition module 306 has identified the device in the captured image as a smart lock, the interrogation based device identification system 132 may use the registry 312 to determine the first smart lock may be capable of unlocking the deadbolt in response to a transmitted instruction to do so, as shown in the fourth row of registry 312. In such an embodiment, the interrogation based device identification system may transmit such an instruction to unlock the deadbolt to a MAC or IP address not associated with a device name. If the device captured in the image responds to the transmitted instruction by unlocking the deadbolt, the interrogation based device identification system 132 may associate that MAC or IP address with the first smart lock. In another embodiment, the interrogation based device identification system may transmit such an instruction to unlock the deadbolt to one of several detected devices. If the device captured in the image responds to the transmitted instruction by unlocking the deadbolt, the interrogation based device identification system 132 may identify that one of several detected devices as the first smart lock.

As yet another example, in an embodiment in which the object recognition module 306 has identified the device in the captured image as a motor, the interrogation based device identification system 132 may use the registry 312 to determine the motor may be capable of turning on in response to a transmitted instruction to do so, as shown in the fifth row of registry 312. In such an embodiment, the interrogation based device identification system may transmit such an instruction to turn on to one of several detected devices. If the device captured in the image responds to the transmitted instruction by turning on, the interrogation based device identification system 132 may identify the one of several detected devices as the motor. In another embodiment, the interrogation based device identification system may transmit such an instruction to turn on to a MAC or IP address not associated with a device name. If the device captured in the image responds to the transmitted instruction by turning on, the interrogation based device identification system 132 may associate that MAC or IP address with the motor.

In an embodiment in which the device captured in the image is identified as a type of sensor, the interrogation based device identification system 132 in an embodiment may access the registry 312 in order to determine what type of stimulus it may provide in order to provoke an action from the unknown device in order to positively associate the unknown device with one of the MAC or IP addresses identified. For example, in an embodiment in which the object recognition module 306 has identified the device in the captured image as a laptop having a microphone sensor, the interrogation based device identification system 132 may use the registry 312 to determine the microphone may be capable of detecting an acoustic stimulus (e.g. sound), as shown in the sixth row of registry 312. In such an embodiment, the interrogation based device identification system may emit a sound or instruct a user to do so. If the laptop microphone identified in the captured image in such an embodiment responds to such stimulus by transmitting a message indicating as much to the tablet via the MAC or IP address not associated with a device name, the interrogation based device identification system 132 may associate that MAC or IP address with the laptop having a microphone. In another embodiment, if the tablet receives a message from one of several detected devices indicating that device detected the stimulus, the interrogation based device identification system 132 may identify that one of several detected devices as the laptop having a microphone.

As another example, in an embodiment in which the object recognition module 306 has identified the device in the captured image as a fingerprint scanner, the interrogation based device identification system 132 may use the registry 312 to determine the fingerprint scanner may be capable of detecting a biological stimulus (e.g. fingerprint of an authorized user), as shown in the seventh row of registry 312. In such an embodiment, the interrogation based device identification system may instruct a user to place a finger on the scanner. If the fingerprint scanner identified in the captured image responds to such stimulus by transmitting a message indicating it has detected a fingerprint of a user attempting to access its system to the tablet via the MAC or IP address not associated with a device name, the interrogation based device identification system 132 may associate that MAC or IP address with that fingerprint scanner. In another embodiment, if the tablet receives a message from one of several detected devices indicating that device detected the stimulus, the interrogation based device identification system 132 may identify that one of several detected devices as the fingerprint scanner.

As another example, in an embodiment in which the object recognition module 306 has identified the device in the captured image as a smart lock, the interrogation based device identification system 132 may use the registry 312 to determine the second, third, and fourth smart locks may be capable of detecting an electrical, mechanical, or magnetic stimulus, as shown in the eighth, ninth, and tenth rows of registry 312. In such an embodiment, the interrogation based device identification system may instruct a user to provide an electronic stimulus by entering a passcode on the keypad. If the smart lock identified in the captured image responds to such stimulus by transmitting a message indicating someone is attempting to access the lock to the tablet via the MAC or IP address not associated with a device name, the interrogation based device identification system 132 may associate that MAC or IP address with the second smart lock. In another embodiment, if the tablet receives a message from one of several detected devices indicating that device detected the stimulus, the interrogation based device identification system 132 may identify that one of several detected devices as the second smart lock.

In an example embodiment, the third smart lock may also be capable of determining when the deadbolt has been turned based on mechanical or magnetic stimuli. For example, the third smart lock may be capable of detecting a mechanical stimulus when the shaft to which the deadbolt is attached rotates to engage the deadbolt lock. In such a situation, the interrogation based device identification system 132 may instruct a user to turn the deadbolt of the smart lock captured in the image in order to provoke the mechanical stimulus. If the smart lock identified in the captured image responds to such stimulus by transmitting a message indicating the deadbolt has been turned to the tablet via the MAC or IP address not associated with a device name, the interrogation based device identification system 132 may associate that MAC or IP address with the third smart lock. In another embodiment, if the tablet receives a message from one of several detected devices indicating that device detected the stimulus, the interrogation based device identification system 132 may identify that one of several detected devices as the third smart lock.

In another example embodiment, the door-mounted plate that receives the deadbolt in the fourth smart lock may include a magnet, and the deadbolt may also include a magnet. In such an embodiment, the fourth smart lock may also be capable of determining the when the deadbolt has been engaged via the magnetic stimulus generated when those two magnets engage or disengage. In such an embodiment, the interrogation based device identification system 132 may instruct a user to turn the deadbolt in order to provoke the magnetic stimulus. If the smart lock identified in the captured image responds to such stimulus by transmitting a message indicating the deadbolt has been turned to the tablet via the MAC or IP address not associated with a device name, the interrogation based device identification system 132 may associate that MAC or IP address with the fourth smart lock. In another embodiment, if the tablet receives a message from one of several detected devices indicating that device detected the stimulus, the interrogation based device identification system 132 may identify that one of several detected devices as the fourth smart lock.

As another example, in an embodiment in which the object recognition module 306 has identified the device in the captured image as an IoT camera, the interrogation based device identification system 132 may use the registry 312 to determine a first IoT camera may be capable of detecting an optical stimulus, as shown in the eleventh row of registry 312. In an example embodiment, the interrogation based device identification system may instruct a user to wave an arm in order to provide the optical stimulus to trigger a motion sensing ability of the camera. If the IoT camera identified in the captured image responds to such stimulus by transmitting a message indicating it has detected a nearby human to the tablet via the MAC or IP address not associated with a device name, the interrogation based device identification system 132 may associate that MAC or IP address with the first IoT camera. In another embodiment, if the tablet receives a message from one of several detected devices indicating that device detected the stimulus, the interrogation based device identification system 132 may identify that one of several detected devices as the first IoT camera.

As another example, in an embodiment in which the object recognition module 306 has identified the device in the captured image as an IoT camera, the interrogation based device identification system 132 may use the registry 312 to determine a second IoT camera may be capable of detecting a thermal stimulus, as shown in the twelfth row of registry 312. In an example embodiment, the interrogation based device identification system may instruct a user to approach the camera in order to provide a thermal stimulus to trigger the infrared capabilities of the camera. If the IoT camera identified in the captured image responds to such stimulus by transmitting a message indicating it has detected a nearby human to the tablet via the MAC or IP address not associated with a device name, the interrogation based device identification system 132 may associate that MAC or IP address with the second IoT camera. In another embodiment, if the tablet receives a message from one of several detected devices indicating that device detected the stimulus, the interrogation based device identification system 132 may identify that one of several detected devices as the second IoT camera. In such a way, the interrogation based device identification system 132 in an embodiment may positively identify the MAC or IP address as belonging to an identified nearby device through a method of device interrogation.

Figure 4:
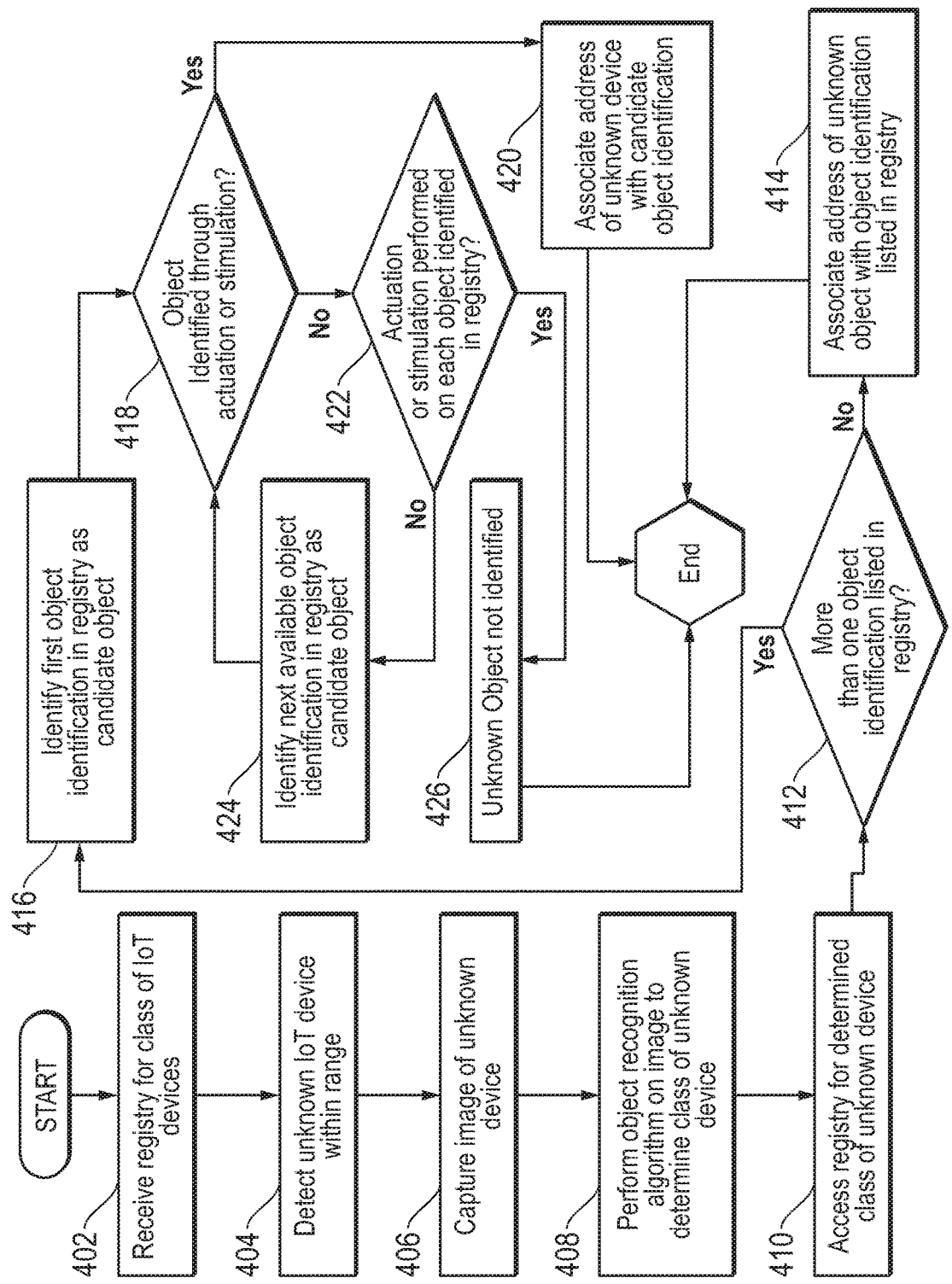
FIG. 4 is a flow diagram illustrating a method of associating an unknown object with a MAC or IP address according to an embodiment of the present disclosure.

FIG. 4 is a flow diagram illustrating a method of associating an unknown object whose image has been captured with a MAC or IP address according to an embodiment of the present disclosure. At block 402, an interrogation based device identification system in an embodiment may receive a registry associated with a given class of IoT devices. For example, in an embodiment described with reference to FIG. 3, the interrogation based device identification system 132 may access one or more registries (e.g. 312). The registry 312 may be generated by querying a database, such as, for example, a machine learning data base (MLDB) containing data describing a plurality of IoT devices. Such a MLDB may be located within the information handling system executing instructions of the interrogation based device identification system 132, or it may be located remotely from such an information handling system. The data stored within the MLDB may have been recorded by the information handling system executing instructions of the interrogation based device identification system 132, or may have been drawn from a plurality of information handling systems (e.g. crowd-sourced). The interrogation based device identification system 132 may record such information regarding the actuation and/or stimulation abilities of an IoT device through a polling or inquiry action. Results of such polling or inquiry may be stored in the MLDB for future use in generating registries. The interrogation based device identification system 132 may receive the registry at block 402 from a remote location, or may receive the registry 312 by querying the MLDB located within the same information handling system as the interrogation based device identification system 132.

The interrogation based device identification system in an embodiment may detect a MAC or IP address of an unknown IoT device within range of itself at block 404. For example, in an embodiment described with reference to FIG. 2, an interrogation based device identification system operating onboard tablet 202 in an embodiment may detect laptop 204, smart camera 206, wireless communication towers 208-212, DC motor 214, smart lock 216, and/or the other motor 218. In other embodiments, the interrogation based device identification system may identify other smart devices not shown in FIG. 2, such as smart LED light bulbs or outlets. In some embodiments, such detection may be performed through polling or inquiry. In such embodiments, the detected device may be "unknown" in that the MAC or IP address detected does not specifically identify the device or type of device to which it belongs. In other embodiments, the detected device may be "unknown" in that the identification of the device within a list of detected devices does not provide information sufficient to differentiate the "unknown" device from the rest of the list of detected devices.

At block 406, a camera operably connected to the interrogation based device identification system in an embodiment may capture an image of an unknown device. For example, in an embodiment described with reference to FIG. 2, a camera of the tablet 202 may capture an image of the laptop 204, smart camera 206, wireless communication towers 208-212, DC motor 214, smart lock 216, and/or the other motor 218. In an embodiment described with reference to FIG. 3, the tablet camera 114 may transmit the image of the captured device to an object recognition module 306 at arrow 304.

An object detection module operably connected to the camera and the interrogation based device identification system in an embodiment may perform an object recognition algorithm on the captured image to determine the class of the unknown device at block 408. For example, in an embodiment described with reference to FIG. 2, the object detection module may perform an object recognition algorithm to determine the device in the captured image is a wireless communication tower (e.g. 208, 210, or 212). As another example, the object detection module in such an embodiment may perform an object recognition algorithm to determine the device in the captured image is laptop computing device 204. In yet another example, the object detection module in such an embodiment may perform the object recognition algorithm to determine the device in the captured image is smart lock IoT device 216. The object recognition module 306 in an embodiment may employ any object recognition algorithm known in the art, such as, for example, the Viola-Jones Object Recognition Framework, and other machine learning or neural network recognition systems.

At block 410, the interrogation based device identification system in an embodiment may access the registry associated with the determined class of the unknown device. For example, in an embodiment in which the object in the captured image is identified as a wireless communication tower, the interrogation based device identification system may access a registry associated with wireless communication towers. In one embodiment, such a registry may include only one possible device within the category of laptop computers. For example, in an embodiment described with reference to FIG. 3, the registry 312 may contain only one laptop device.

In other embodiments, such a registry may include a plurality of specific models of wireless communications towers. For example, in an embodiment described with reference to FIG. 2, if the wireless communication towers 208-212 are three different types of wireless communication towers, the registry accessed at block 410 may include each of those three different types. As described herein, upon identifying the object in the image as a wireless communication tower, it may not be clear which of the three types of wireless communication towers the object is. In another embodiment in which the object identified in the image is a smart lock 216, the registry may contain four different types of smart locks. Again, identification of the object in the image as a smart lock may not determine the exact smart lock 216 the object is.

The interrogation based device identification system may determine at block 412 whether the registry lists more than one object identification in an embodiment. For example, in an embodiment described with reference to FIG. 3, the registry 312 may contain only one laptop object identification (e.g. in the sixth row). In contrast, and as another example, the registry 312 may contain five different types of smart lock identifications (e.g. in the fourth, eight, ninth, and tenth rows). If the interrogation based device identification system determines only one object is identified in the registry, the method may proceed to block 414. If the interrogation based device identification system determines more than one object identification is listed in the registry, the method may proceed to block 416.

At block 414, if interrogation based device identification system determines the registry includes only one listed object identification, the interrogation based device identification system in an embodiment may associate the address of the unknown object with the object identification listed in the registry. For example, in an embodiment in which the registry only lists one identification for a laptop device, the interrogation based device identification system may identify the unknown laptop as the laptop identified in the registry.

In an embodiment in which the interrogation based device identification system has determined more than one object identification is listed in the registry, the interrogation based device identification system may identify the first object identification in the registry as a candidate object at block 416. For example, in an embodiment in which the object in the captured image has been identified as a smart lock, the interrogation based device identification system may identify the first smart lock device listed in the fourth row of the registry 312 as the candidate object.

At block 418, the interrogation based device identification system in an embodiment may determine whether the candidate object is identified through actuation or stimulation. For example, in an embodiment in which the first smart lock device listed in the fourth row of the registry 312 is the candidate object, the interrogation based device identification system 132 may determine whether performing the actuation "unlock" associated with the first smart lock in the registry 312 positively identifies the MAC or IP address associated with the smart lock captured by the camera 114 in the image. The process of identification through actuation or stimulation may be described in greater detail herein, and particularly with reference to FIG. 5. If the interrogation based device identification system identifies the candidate object through actuation or stimulation, the method may proceed to block 420. If the interrogation based device identification system does not identify the candidate object through actuation or stimulation, the method may proceed to block 422.

In an embodiment in which the interrogation based device identification system identifies the candidate object through actuation or stimulation, the interrogation based device identification system may positively identify the unknown device (e.g. from within several detected devices) as the candidate object, or may associate the MAC or IP address of the unknown device with the candidate object identification at block 420. In an example embodiment described with reference to FIG. 3, the interrogation based device identification system 132 may identify the smart lock captured by the camera 114 in the image as the first smart lock device listed in the fourth row of the registry 312. In such an embodiment, the interrogation based device identification system may identify one device within a list of several detected devices (where the name of the one device does not provide enough information to differentiate it from the rest of the detected devices) as the first smart lock device. As another example of such an embodiment, the interrogation based device identification system may associate the MAC or IP address detected at block 404 with the first smart lock device. In such a way, the interrogation based device identification system may identify an IoT device such that it may be differentiated from other detected devices, or may associate an unknown IoT device with its MAC or IP address. The method may then end.

In an embodiment in which the interrogation based device identification system does not identify the candidate object through actuation or stimulation, at block 422, the interrogation based device identification system may determine whether actuation or stimulation has been performed on each object identified in the registry. For example, if the smart lock identified in the image captured by camera 114 in an embodiment is not positively identified as the first smart lock identified in the fourth row of registry 312, the interrogation based device identification system may identify actuation or stimulation has not been attempted on the second smart lock in the eighth row of the registry 312. As another example, if the second IoT camera is the current candidate object, the interrogation based device identification system in an embodiment may determine stimulation and actuation have been tried on each of the known IoT cameras. If an actuation or stimulation has not been performed on each of the objects identified in the registry, the method may proceed to block 424. If an actuation or stimulation has been performed on each of the objects identified in the registry, the method may proceed to block 426.

In an embodiment in which an actuation or stimulation has not been performed on each of the objects identified in the registry, the interrogation based device identification system may identify the next available object in the registry as the candidate object at block 424. For example, if the smart lock identified in the image captured by camera 114 in an embodiment is not positively identified as the first smart lock identified in the fourth row of registry 312, the interrogation based device identification system may identify the second smart lock in the eighth row of the registry 312 as the next candidate object. The method may then proceed back to block 418 to determine whether the current candidate object (e.g. the second smart lock) can be identified as the object in the captured image through actuation or stimulation. The loop between blocks 418 and 424 may be repeated in an embodiment until the object in the captured image is identified through actuation or stimulation, until all of the objects within the same class or type of objects as the device recognized in the captured image have been eliminated as possible matches, or until all possible actuations or stimulations have been attempted in order to identify the device in the captured image.

In an embodiment in which an actuation or stimulation has been performed on each of the objects identified in the registry, at block 426 the interrogation based device identification system may determine the unknown object cannot be identified. For example, in an embodiment in which the IoT camera has not been identified as either the first or second IoT camera through actuation or stimulation, the interrogation based device identification system may determine the identity of the object identified in the captured image is unknown. In another example, the interrogation based device identification system may determine the object identified in the captured image is unknown if all possible actuations or stimulations have been attempted in order to identify the device in the captured image without success. The method may then end.

Figure 5:
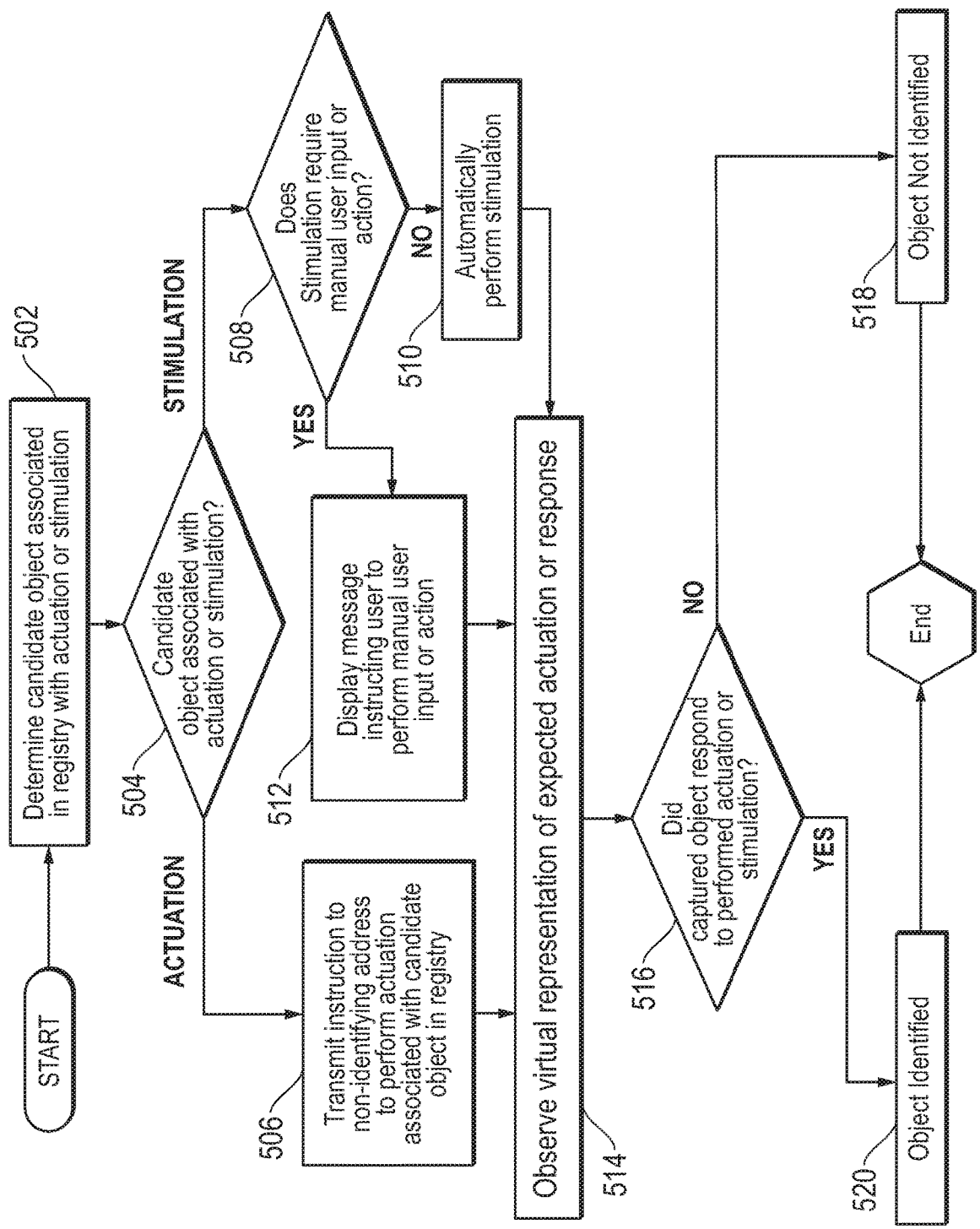
FIG. 5 is a flow diagram illustrating a method of interrogating a device whose identity is not known according to an embodiment of the present disclosure.

FIG. 5 is a flow diagram illustrating a method of interrogating a device whose identity is not known by providing a specific stimulus or by instructing a specific actuation according to an embodiment of the present disclosure. As described herein, the interrogation based device identification system in an embodiment may have detected one or more MAC or IP addresses for nearby devices that do not identify the exact device to which those addresses apply. As also described herein, an image of a nearby device to which the MAC or IP address may belong has been captured, and the general type or class of that device may have been determined using an object detection algorithm. The interrogation based device identification system in such an embodiment may identify a plurality of specific devices within the identified type or class, each of which may be a potential match to the device captured in the image. Each of these potential matches may be referred to herein as candidate objects. The interrogation based device identification system may determine which of these candidate objects the device in the captured image is, if any, in order to identify the captured device's address. The method of FIG. 5 may be used to determine whether the device whose image has been captured is the device to which the non-identifying MAC or IP address belongs.

At block 502, the interrogation based device identification system in an embodiment may determine the candidate object is associated in the registry with an actuation or stimulation. For example, in an embodiment described with reference to FIG. 3, the interrogation based device identification system may access the registry 312 to find a plurality of object identifications in column 314, each of which may be designated as a candidate object. As shown in FIG. 4, each candidate object in the registry 312 may be associated with either a possible actuation shown in column 316, or a possible stimulus shown in column 318. Thus, each candidate object from column 314 may be associated with either a possible actuation from column 316 or a possible stimulus from column 318.

The interrogation based device identification system in an embodiment may determine whether the candidate object is associated with an actuation or a stimulation in the registry at block 504. For example, in an embodiment described with reference to FIG. 3, if the device in the captured image has been identified as a wireless communication tower, the interrogation based device identification system 132 may have identified the wireless communication tower listed in the fourth row of the registry 312 as the candidate object. In such an embodiment, the interrogation based device identification system 132 may determine the wireless communication tower candidate object is associated with a possible actuation, rather than a stimulation. In contrast, and as another example, in an embodiment in which the device in the captured image has been identified as a smart lock, the interrogation based device identification system 132 may have identified the second smart lock listed in the eighth row of the registry 312 as the candidate object. In such an embodiment, the interrogation based device identification system 132 may determine the second smart lock is associated with a possible stimulation, rather than an actuation. If the candidate object is associated with an actuation, the method may proceed to block 506. If the candidate object is associated with a stimulation, the method may proceed to block 508.

At block 506, in an embodiment in which the interrogation based device identification system determines the candidate object is associated with an actuation, the interrogation based device identification system in an embodiment may transmit an instruction to the non-identifying, detected MAC or IP address to perform an actuation associated with the candidate object in the registry. For example, in an embodiment described with reference to FIG. 3, in which the candidate object is the wireless communication tower, it may be associated with the actuation of a blinking light, as shown in the fourth row of the registry 312. In such an example embodiment, the interrogation based device identification system may transmit an instruction to the non-identifying MAC or IP address to make a light on the wireless communication tower blink. The method may then proceed to block 514 to observe a virtual or visual representation of the expected actuation or response.

In an embodiment in which the interrogation based device identification system determines the candidate object is associated with a stimulation, the interrogation based device identification system may determine at block 508 whether the stimulation requires manual user input or action. For example, in an embodiment described with respect to FIG. 3, in which the candidate object is the laptop device, it may be associated with the acoustic stimulus of making a discernable or preset sound. The tablet executing the code instructions of the interrogation based device identification system may be capable of generating such a discernable or preset sound via its speakers. In contrast, as another example, in an embodiment in which the candidate object is the second smart lock, it may be associated with the electrical stimulus of pressing a series of numbers on a keypad. In such a scenario, the tablet may not be capable of automatically entering those numbers and may need to enlist the user to manually input those values. As yet another example, in an embodiment in which the candidate object is the fourth smart lock, it may be associated with the mechanical stimulus of turning the deadbolt. In such a scenario, the tablet may not be capable of automatically turning the deadbolt, and may need to enlist the help of the user to affect that stimulus by manually turning the deadbolt. If the stimulation does not require manual user input or action, the method may proceed to block 510. If the stimulation requires manual user input or action, the method may proceed to block 512.

At block 510, in an embodiment in which the stimulation does not require manual user input or action, the interrogation based device identification system may automatically perform the stimulation associated with the candidate object in an embodiment. For example, in an embodiment described with respect to FIG. 3, in which the candidate object is the laptop device, it may be associated with the acoustic stimulus of making a discernable or preset sound. At block 510, the tablet executing the code instructions of the interrogation based device identification system may generate such a discernable or preset sound via its speakers. The method may then proceed to block 514 to observe a virtual or visual representation of the expected actuation or response.

At block 512, in an embodiment in which the stimulation does require manual user input or action, the interrogation based device identification system in an embodiment in an embodiment may display a message instructing the user to perform the manual user input or action. For example, in an embodiment in which the tablet is not capable of automatically entering numbers into a keypad of the second smart lock, it may display instructions via its video display instructing the user to manually input those values. As another example, in an embodiment in which the tablet is not capable of automatically turning the deadbolt of the fourth smart lock candidate object, the tablet may display instructions via its video display instructing the user to manually turn the deadbolt.

The interrogation based device identification system in an embodiment may observe a virtual or visual representation of the expected actuation or response at block 514. For example, in some embodiments, the processor executing code instructions of the interrogation based device identification system may be operably connected to a peripheral virtual reality or augmented reality head mounted display device. In such an embodiment, a camera within the head mounted display device may capture an image of the object after it has been prompted to perform an actuation or otherwise respond to a stimulation. For example, an HVAC unit may respond to an instruction transmitted at block 506 by blinking a series of LEDs in a particular preset pattern. The head mounted display in such an embodiment may capture an image of the HVAC LEDs displaying such a pattern, and work with the interrogation based device identification system to determine the displayed pattern is a visual representation of the actuation expected from the instructions transmitted at block 506.

As another example, in an embodiment in which the candidate object is the laptop device, and the interrogation based device identification system generated a preset sound via its speakers at block 510, the head mounted display device may capture an image of the laptop moving to an awake state in response at block 514. The interrogation based device identification system in such an embodiment may identify the observed awake state of the laptop as a visual representation of the expected response to the stimulation of generating the preset sound.

At block 516, the interrogation based device identification system in an embodiment may determine whether the object captured in the image responded to the performed actuation or stimulation. For example, in an embodiment in which the interrogation based device identification system transmitted an instruction to non-identifying MAC or IP address to blink a light on a wireless communication tower, the interrogation based device identification system may determine at block 516 whether the device captured in the image reacted to that instruction by blinking the light as instructed. Such a blinking light may be observed in an embodiment by the camera operably connected to the interrogation based device identification system. In other embodiments in which the candidate object is associated with a possible stimulus rather than an actuation, the interrogation based device identification system may determine at block 516 whether it received a message via the non-identifying MAC or IP address in response to the stimulus affected. For example, in an embodiment in which the interrogation based device identification system automatically generated a preset sound as a stimulus for a laptop candidate object, the interrogation based device identification system may determine whether the laptop responded to that preset sound by transmitting a message to the interrogation based device identification system via the non-identifying MAC or IP address indicating the laptop detected the sound. As another example, in an embodiment in which the user manually turned the deadbolt of the smart lock device captured in the image, the interrogation based device identification system may determine whether the smart lock responded to that mechanical stimulus by transmitting a message to the interrogation based device identification system via the non-identifying MAC or IP address indicating the deadbolt had been manually turned. If the captured object did not respond to the performed actuation or stimulation, the method may proceed to block 518. If the captured object responded to the performed actuation or stimulation, the method may proceed to block 520.

In an embodiment in which the captured object did not respond to the performed actuation or stimulation, the interrogation based device identification system may determine at block 518 that the object has not been identified. For example, the interrogation based device identification system in an embodiment may have transmitted an instruction to a non-identifying MAC or IP address to blink a light on a wireless communication tower, but the device captured in the image did not blink the light. In such an embodiment, the interrogation based device identification system may determine at block 518 that the wireless communication tower identified in the captured image is not the specific type of wireless communication tower described by the candidate object in the registry. The method may then end, and the interrogation based device identification system may perform the method of FIG. 5 for another candidate object, as described with reference to FIG. 4.

In contrast, in an embodiment in which the captured object did responds to the performed actuation or stimulation, the interrogation based device identification system may determine at block 520 that the object has been identified. For example, in an embodiment in which the user manually turned the deadbolt of the smart lock device captured in the image, the smart lock captured in the image may have responded to that mechanical stimulus by transmitting a message to the interrogation based device identification system via the non-identifying MAC or IP address indicating the deadbolt had been manually turned. In such an embodiment, the interrogation based device identification system may determine at block 520 that the device captured in the image has been identified as the fourth smart lock listed in the tenth row of the registry 312. In such a way, the interrogation based device identification system may identify an unknown IoT device by its MAC or IP address. The method may then end.

The blocks of the flow diagrams of FIGS. 4-5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an interrogation based device identification system comprising:
   a network adapter detecting two or more devices of a known class of devices in communication with the information handling system;
   a processor identifying one of the two or more devices of the known class of devices as an unknown device;
   a camera capturing a first digital image of the unknown device;
   a processor determining the unknown device belongs to the known class of devices via an object recognition algorithm analyzing the first digital image;
   the processor executing code instructions of the interrogation based device identification system to:
      access a device class registry listing a plurality of candidate object identifications associated with the known class of devices stored in a memory;
      identify an actuation instruction associated with a first of the plurality of candidate device identifications within the memory;
      instruct the network adapter to transmit the actuation instruction to the unknown device;
      determine the unknown device performed an action associated with the first of the plurality of candidate device identifications within the device class registry; and
      associate the unknown device with the first of the plurality of candidate device identifications.

2. The information handling system of claim 1, wherein the actuation instruction is an instruction for the unknown device to power on.

3. The information handling system of claim 1, wherein the actuation instruction is an instruction for a light emitting diode of the unknown device to power on.

4. The information handling system of claim 1, wherein the actuation instruction is an instruction for a plurality of light emitting diodes of the unknown device to power on according to a preset pattern.

5. The information handling system of claim 1, wherein the camera is mounted within an augmented reality head mounted display system.

6. The information handling system of claim 1 further comprising:
   the camera capturing a second digital image of the unknown device while the unknown device performs the action to verify the performed action.

7. The information handling system of claim 1 further comprising:
   the processor receiving a user input indicating the unknown device performed the action.

8. A method of identifying an unknown device via interrogation comprising:
   determining a communication address of an unknown device in communication with an information handling system via a network adapter;
   capturing a first digital image of the unknown device via a camera;
   determining the unknown device belongs to a known class of devices via a processor executing an object recognition algorithm to analyze the first digital image;
   accessing via the processor a device class registry listing a plurality of candidate object identifications associated with the known class of devices stored in a memory;
   identifying a stimulus action associated with a first of the plurality of candidate device identifications within the memory;
   if the stimulus action does not require user manual activity, performing the stimulus action;
   receiving an indication via the communication address indicating the unknown device detected the stimulus action; and
   associating the communication address of the unknown device with the first of the plurality of candidate device identifications.

9. The method of claim 8, wherein the stimulus action is applying an impulse signal to the unknown device.

10. The method of claim 8, wherein the stimulus action includes making an audible noise.

11. The method of claim 8 further comprising:
    determining the stimulus action requires user manual activity; and
    prompting the user via a visual user interface to perform the required user manual activity.

12. The method of claim 11, wherein the stimulus action is placing a finger on a fingerprint scanner.

13. The method of claim 11, wherein the stimulus action is the user moving within a specified distance of the unknown device.

14. The method of claim 11, wherein the stimulus action is the user physically moving a subcomponent of the unknown device.

15. An information handling system operating an interrogation based device identification system comprising:
- a network adapter determining a communication address of an unknown device in communication with the information handling system via a network;
- a camera capturing a first digital image of the unknown device;
- a processor determining the unknown device belongs to a known class of devices via an object recognition algorithm analyzing the first digital image;
- the processor executing code instructions of the interrogation based device identification system to:
  - access a device class registry listing a plurality of candidate object identifications associated with the known class of devices stored in a memory;
  - identify a stimulus action associated with a first of the plurality of candidate device identifications within the memory;
  - determine the stimulus action requires user manual activity;
  - display via a video display an instruction for the user to perform the user manual activity;
  - receive an indication via the communication address indicating the unknown device detected the stimulus action; and
  - associate the communication address of the unknown device with the first of the plurality of candidate device identifications.

16. The information handling system of claim 15, wherein the stimulus action is placing a finger on a fingerprint scanner.

17. The information handling system of claim 15, wherein the stimulus action is the user moving within a specified distance of the unknown device.

18. The information handling system of claim 15, wherein the stimulus action is the user physically moving a subcomponent of the unknown device.

19. The information handling system of claim 15, wherein the communication address is an internet protocol address.

20. The information handling system of claim 15, wherein the communication address is a media access control identification.

* * * * *